Dec. 13, 1949     C. H. SCHLESMAN     2,491,418
AUTOMATIC INSPECTION DEVICE
Filed April 4, 1946     2 Sheets-Sheet 1
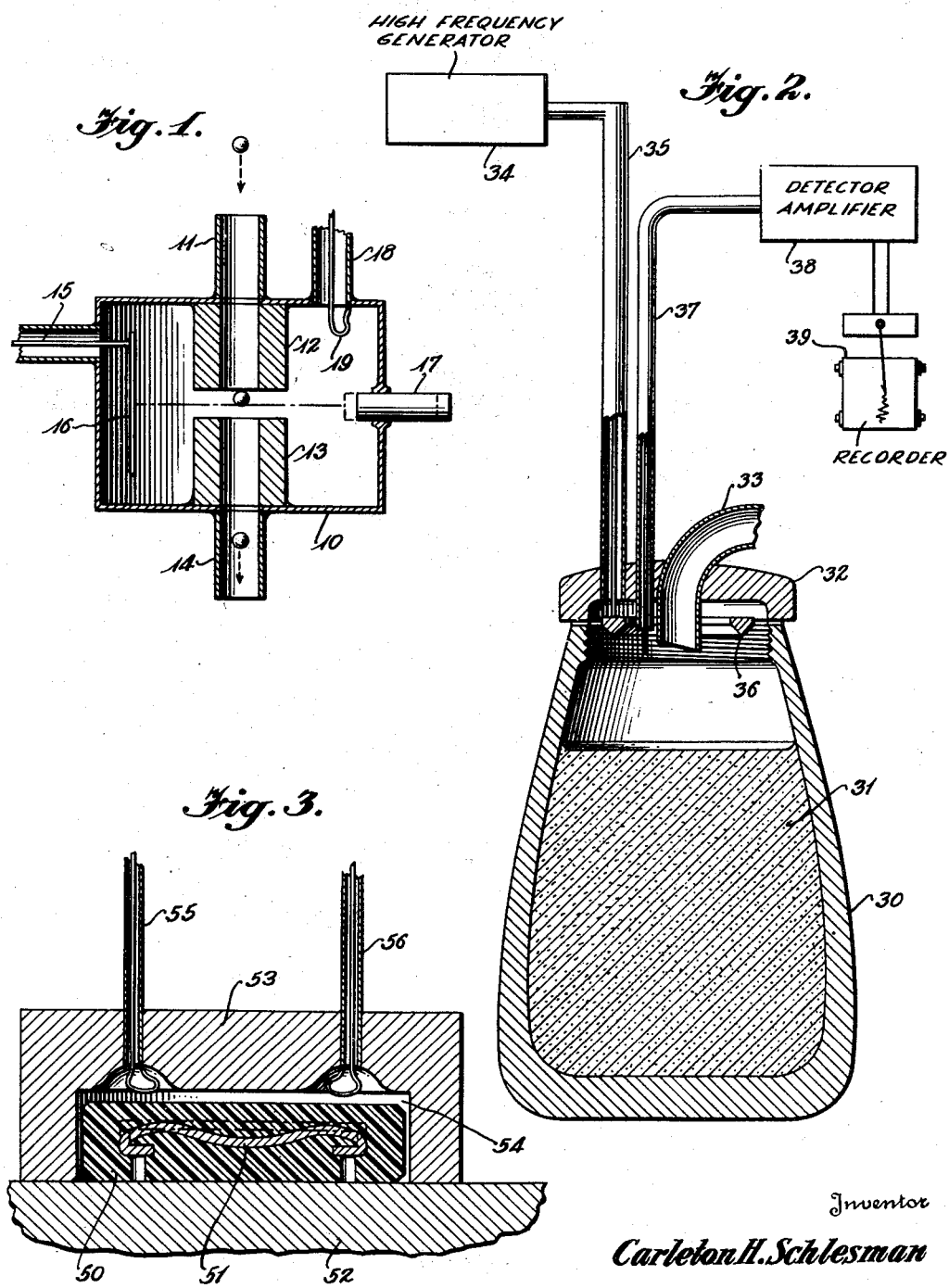
Inventor
Carleton H. Schlesman
By James Y. Cleveland
Attorney Dec. 13, 1949  C. H. SCHLESMAN  2,491,418
AUTOMATIC INSPECTION DEVICE
Filed April 4, 1946  2 Sheets-Sheet 2
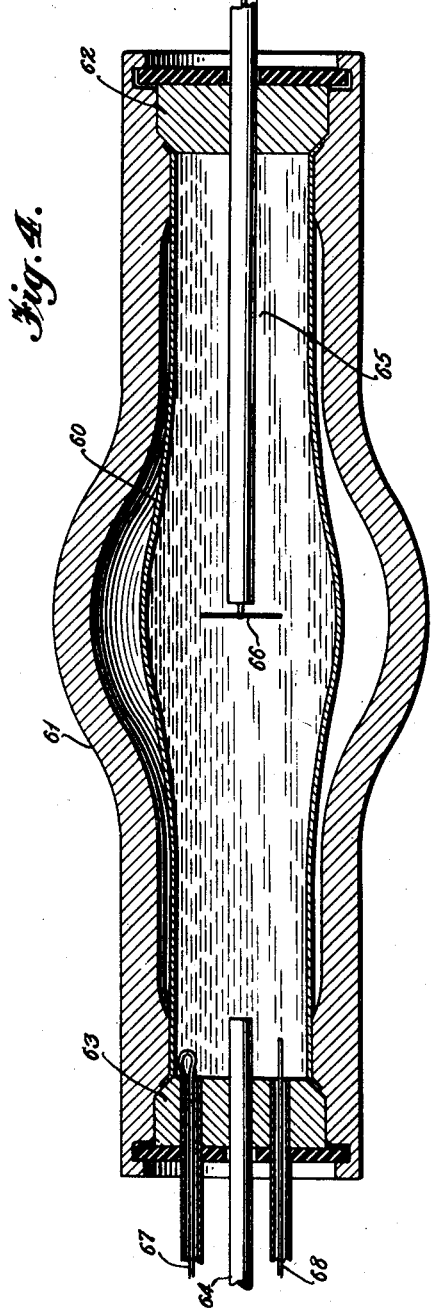
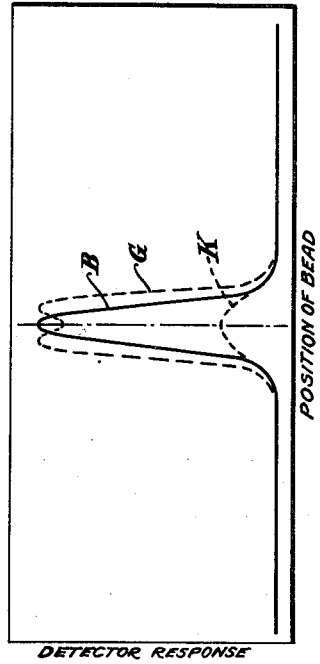
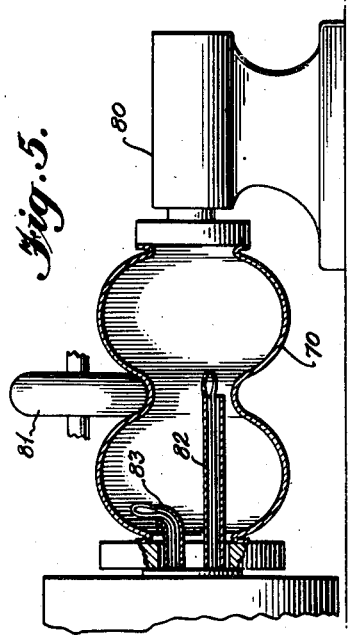
Inventor
Carleton H. Schlesman
By James Y. Cleveland
Attorney Patented Dec. 13, 1949

2,491,418

UNITED STATES PATENT OFFICE 2,491,418

AUTOMATIC INSPECTION DEVICE

Carleton H. Schlesman, Camden, N. J., assignor to Socony-Vacuum Oil Company, Incorporated, a corporation of New York Application April 4, 1946, Serial No. 659,643

2 Claims. (Cl. 153—73)

This invention relates to the inspection of objects and more particularly to the inspection of objects by use of the phenomenon of cavity resonance of high frequency electrical currents.

A myriad of inspection methods have been applied to a multitude of objects to be inspected and the methods and objects both fall into so many classes that it is impossible to do more than give a few examples of the prior art. Measurement with micrometers and observation by photocells are two examples. The objects or articles to be inspected may be anything from beads of catalyst to machine parts.

According to the present invention, it has been found that a great variety of objects may be rapidly and efficiently inspected and more information gained from the inspection than was heretofore possible, by inserting these objects in a cavity resonator, or using the objects themselves as a cavity resonator or part of a cavity resonator, and noting the effect of the objects on the resonance. Thus, for example, a cavity resonator may be so constructed and so tuned that when a single bead of a bead catalyst is passed therethrough the resonance will be materially affected. In fact, the resonance may be so materially affected that even small differences in the size or shape or other physical properties of the object being inspected will produce a marked difference in the resonance which can be easily observed by an electrical measuring device.

When it is desired to inspect larger articles or only parts of larger articles, the parts to be inspected may be made a part of the cavity resonator during the period of inspection. Thus, for example, the inside of a hollow machine part may itself be used as a cavity resonator and the resonance characteristics used as an indication of whether or not the inside of the part has been properly machined. Similarly, the inside of a filled, or partially filled, artillery shell might be used as the cavity resonator and the resonance characteristics used as an indication of whether or not the shell has been filled with explosive to the proper level.

Numerous advantages of the present invention and numerous applications of its principles will be apparent from a consideration of the following detailed description and the appended drawings.

In the drawings:

Figure 1 is a diagrammatic illustration of a device for rapidly inspecting a series of small objects;

Figure 2 is a diagrammatic illustration of an arrangement for measuring the level of the filling material in a shell case;

Figure 3 is a diagrammatic illustration of an embodiment of this invention suitable for the inspection of molded plastic parts containing metal inserts;

Figure 4 is a diagrammatic illustration of an embodiment of this invention suitable for inspecting parts in the course of a hydraulic forming operation;

Figure 5 is a diagrammatic illustration of an embodiment of this invention suitable for inspecting parts in the process of a roller forming operation; and Figure 6 is a diagrammatic illustration of the type of indication that may be obtained from an inspection in accordance with Figure 1.

As illustrated in Figure 1, a device for inspecting small objects may consist of a cavity resonator comprising an outside casing 10 and guiding members 11, 12, 13 and 14 through which the objects to be inspected may be allowed to fall and during the course of which fall they may be inspected. As shown, the guides 11 and 14 are external to the cavity resonator and the guides 12 and 13 are inside the resonator. A space is provided between the adjacent ends of the internal guides 12 and 13 so that when the object to be inspected falls through the guide it will fall for a short time through the open space between the guides and during this period will be inspected. The cavity resonator is of such dimensions as to resonate sharply at the frequency to be used. The ultrahigh frequency current to be used for the inspection may be supplied to the cavity resonator through a coaxial cable 15, the sheath of which is connected directly to the shell of the resonator and the core of which is connected to an electrode 16 inside the resonator case.

A movable member 17 may be arranged to extend through the wall of the cavity resonator and be adjustable to adjust the frequency of response to the resonator. The output of the resonator, the magnitude of which will depend upon whether or not the resonator is in resonance with the ferquency supplied over the coaxial cable 12, may be taken from the resonator by a coaxial cable 18, the outer sheath of which is connected directly to the resonator casing and the core of which is connected by a pickup loop 19 to the same casing.

A suitable electrical measuring device may be used to measure the output of the cavity resonator, for example, the device illustrated in Figure 3 of application Serial No. 658,898, filed April 2, 1946, by Clarence I. Glassbrook.

The amount of energy transmitted through the resonance inspection device is a measure of the state of resonance of the inspection device and ultimately of the size, the shape and other physical characteristics of the object or objects inspected. If desired, a counting circuit may also be attached to the output circuit of the resonant inspection device to count the number of objects inspected. Further, a rejection relay may be operated from this circuit in such a manner as to actuate rejection mechanism that will reject any unsuitable objects that pass through the inspection device.

As illustrated in Figure 6, a record of the inspection of an object by the new inspection device may be a peaked curve such as indicated at B, if the object inspected is perfect, and therefore causes the cavity resonator to reach a condition of perfect resonance. If the object is too small or has some physical characteristic which prevents the cavity resonator from reaching full resonance, the curve such as indicated at K may result. On the other hand, if the object is too large or has some physical characteristic which results in the cavity resonator going past the point of peak resonance, it may be that the cavity resonator will reach peak resonance at two points, one as the object enters the space between the guides, and again as the object leaves the space between the guides. This will result in a two-humped curve such as illustrated at G. Depending upon the particular imperfection that is likely to be found in the objects being inspected, the meaning of any variation from normal in the shape of the resulting curve may be easily understood.

As illustrated in Figure 2, the principles of this invention are applied to the filling of containers, such as artillery shells. In the filling of such containers, it is highly important that the containers be filled to exactly the right level and it is highly advantageous to have a quick, efficient method of determining whether or not this has been accomplished. The present method of inspection rapidly and efficiently determines any irregularity whatever in the filling operation and hence is particularly well suited to the making of such inspections.

In the illustrated arrangement, a shell casing 30, which is to be filled with molten explosive 31, is moved into position under a cap member 32, which cap closes the upper open end of the shell casing sufficiently to form with the shell casing a cavity that can be used electrically as a cavity resonator. It is not necessary for this purpose that the seal between the cap 32 and the shell casing 30 be airtight, and it has been found desirable to leave sufficient space between the two so that air can pass freely out of the cavity. A filler pipe 33 is arranged to pass through the cap 32 and into the cavity for the purpose of filling the shell casing with molten explosive.

During the filling operation, a high frequency electrical current is fed into the cavity formed by the cap 32 and the shell casing 30 from a high frequency generating unit 34 connected by a coaxial cable 35 to the cavity. This connection is accomplished by grounding the outer conductor of the coaxial cable to the cap 32 and connecting the central conductor of the coaxial cable to a radiating ring 36 positioned just below the cap within the cavity.

High frequency current is then taken from the cavity by a coaxial cable 37 which extends through the cap 32, and this current is conveyed to a detector-amplifier 38 which operates a recorder 39 which records the amount of current received by the detector-amplifier.

Since the cavity formed by the cap 32 and the interior of the shell casing 30 acts as a cavity resonator, the amount of current that will be taken from the cavity by the coaxial cable 37 depends upon the state of resonance of this cavity. By a proper selection of the frequency of the high frequency current supplied to the cavity, the cavity can be caused to be out of resonance at the time that the filling operation is started, that is, when the shell casing is empty, and to be in resonance at the time that the filling operation has been completed. If the shell casing is filled to exactly the proper level at that time, the shell casing is of exactly the desired dimensions, and there is no extraneous material or foreign object in the shell casing. In fact, during the filling operation the recorded current will follow a definite pattern if the filling operation is progressing normally, and any deviation from normal will appear as a variation in the shape of a curve made by the recorder. This permits not only a check of the final level of the molten explosive in the casing, but also a check at every stage of the filling operation.

Arrangements may easily be made if desired for changing the frequency of the current supplied to the shell being filled when the type of shell being filled and hence the size or shape is changed. Further arrangements may be made for minor adjustments of the frequency of the high frequency current supply unit during operation, if desired. Such arrangements will provide for the adjustment of the testing unit to optimum efficiency of operation. If desired, the detector-amplified unit 38 may be furnished with more than one probe for picking up high frequency current from the shell casing so as to increase the sensitivity of the device or avoid any errors that might occur by reason of the failure of a single probe to act properly and efficiently at all times. Many other minor modifications will be obvious to those skilled in the art.

As illustrated in Figure 3, the principles of this invention may also be applied to the inspection of objects containing metal inserts and such inspection will determine whether or not the metal inserts are in proper position in the molded objects. Such an object may comprise a piece of molded synthetic resin 50 containing a metal insert 51. By placing this object on a metal base 52 and covering it with a metal cover 53, a cavity 54 may be formed enclosing the object to be inspected. By supplying this cavity with high frequency electrical current through a coaxial cable 55, and taking high frequency current from the cavity through a coaxial cable 56 in much the same manner as was done with the device of Figure 2, the state of resonance of the cavity may be determined. If the proper frequency of current is used the cavity will be in resonance only when the object in the cavity conforms to the desired specifications, particularly with regard to the positioning of the metal insert in it and thus when the cavity is not in resonance it will be immediately apparent that the metal insert is not in the proper position.

As illustrated in Figure 4, the same principles are applied to the inspection of a part in the course of its being shaped by hydraulic forming. The part 60 to be shaped is of generally tubular shape and is enclosed in a die 61 closed at its ends by plugs 62 and 63 through one of which a fluid is supplied under high pressure by means of a pipe 64.

Extending into the tube 60 through one of the end plugs 62, is a coaxial cable 65 at the inner end of which is a high frequency radiator 66. Extending into the other end of the tubular object 60 through the end plug 63 are a pair of high frequency pickups 67 and 68. By supplying high frequency through the radiator 66 and detecting the amount of high frequency received by the pickups 67 and 68, in the same manner as is done in Figure 2, the shape of the object being formed can easily be determined. For example, when the object under treatment has been expanded until it lies tightly against the die, this fact may be apparent by a peak on the response curve of the recorder operated in accordance with the current picked up by the pickups 67 and 68. After pressure has been released, the springback of the part being formed can be determined by the amount that the recorder drops back.

A similar inspection may be made as illustrated in Figure 5 in the course of shaping a hollow object 70 by rotating the object in a lathe 80 and pressing it with a roller 81. For this purpose a radiator of high frequency current 82 may be arranged to extend into the hollow object and a pickup 83 may also be arranged to extend into the hollow object. The radiator 82 will be connected to a source of high frequency current and the pickup will be connected to a detector-amplifier and from there to a recorder or meter as illustrated in Figure 2. The device will operate in exactly the same manner as the device in Figure 4.

A wide range of frequencies may be used for making inspections of the type illustrated by the several figures, and a wide variety of specific arrangements of parts are of course possible. The arrangements shown in the figures have been found particularly desirable, and frequencies in the range of 100 megacycles have been found satisfactory. It is to be understood, however, that the frequency to be used must necessarily be selected to suit the particular object that is to be inspected, for only by so selecting the frequency to be used can resonance be obtained when the part to be inspected exactly conforms to the specifications.

What is claimed is:

1. A method of inspecting an object undergoing roller forming that comprises forming a cavity resonator comprised at least in part of at least a part of the object undergoing forming, simultaneously applying pressure by means of a roller to form the object, and supplying high frequency electrical current to said resonator and determining the state of resonance of said resonator.

2. A method of inspecting an object undergoing forming that comprises forming a resonant cavity by at least a part of the object undergoing forming, simultaneously forming the object and supplying high frequency electrical current to said resonant cavity, simultaneously taking high frequency electrical current from said resonant cavity, and simultaneously measuring a characteristic of the current taken from said resonant cavity as an indication of the state of resonance of said resonant cavity.

CARLETON H. SCHLESMAN.

REFERENCES CITED

The following references are of record in the file of this patent:

UNITED STATES PATENTS

| Number | Name | Date |
|---|---|---|
| 1,570,781 | Ruben | Jan. 26, 1926 |
| 2,285,151 | Firestone | June 2, 1942 |
| 2,404,797 | Hansen | July 30, 1946 |
| 2,405,814 | Brannin | Aug. 13, 1946 |

OTHER REFERENCES

Reprint from Proceedings of the I. R. E., vol. 33, No. 4, April 1945. A Resonant-Cavity Method for Measuring Dielectric Properties at Ultra-High Frequencies, by Works et al. (Copy in Div. 48.)